(12) United States Patent
Hegberg et al.

(10) Patent No.: US 7,828,012 B2
(45) Date of Patent: Nov. 9, 2010

(54) PORT INTEGRATED WITHIN VALVE STEM

(75) Inventors: Mark C. Hegberg, Elmhurst, IL (US);
Amjed Shafique, Skokie, IL (US);
Prasert Buranatum, Skokie, IL (US);
Chalard Bunluaphob, Glenview, IL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 925 days.

(21) Appl. No.: 11/712,024

(22) Filed: Feb. 28, 2007

(65) Prior Publication Data

US 2008/0202607 A1    Aug. 28, 2008

(51) Int. Cl.
*F16K 37/00* (2006.01)
(52) U.S. Cl. ............... 137/551; 137/557; 251/304; 251/315.1; 251/315.16
(58) Field of Classification Search ........... 137/551, 137/557; 251/304, 315.01, 315.16, 315.1, 251/315.11, 315.12; 73/46
See application file for complete search history.

(56) References Cited

U.S. PATENT DOCUMENTS

| | | | |
|---|---|---|---|
| 3,854,497 A | 12/1974 | Rosenberg | |
| 4,184,510 A | 1/1980 | Murry et al. | |
| 4,204,426 A | 5/1980 | Patton et al. | |
| RE30,902 E | 4/1982 | Lawrence et al. | |
| 4,926,704 A | 5/1990 | Survil et al. | |
| 4,930,361 A | 6/1990 | Nimberger | |
| 4,976,134 A | 12/1990 | Potvin | |
| 5,255,706 A * | 10/1993 | Chudakov | 137/637.3 |
| 5,324,114 A | 6/1994 | Vinci | |
| 5,345,812 A | 9/1994 | Haboian | |
| 5,404,905 A | 4/1995 | Lauria | |
| 5,483,838 A | 1/1996 | Holden | |
| 5,588,462 A | 12/1996 | McHugh | |
| 5,646,352 A | 7/1997 | Joseph et al. | |
| 5,857,663 A | 1/1999 | Evans et al. | |
| 5,927,685 A * | 7/1999 | Gosling | 137/557 |
| 6,053,200 A | 4/2000 | Crochet et al. | |
| 6,167,900 B1 | 1/2001 | Laird | |
| 6,206,034 B1 * | 3/2001 | McHugh | 137/559 |
| 6,209,562 B1 | 4/2001 | Shaw | |
| RE37,617 E | 4/2002 | Sherman | |
| 6,396,404 B1 | 5/2002 | McHugh | |

(Continued)

FOREIGN PATENT DOCUMENTS

DE    93 12 879.7    10/1993

(Continued)

*Primary Examiner*—Kevin L Lee
(74) *Attorney, Agent, or Firm*—RatnerPrestia

(57) ABSTRACT

A valve body defines a fluid passage and a valve sealing body is positioned there. The valve sealing body is operable between open and closed positions which allow for fluid-flow and non-flow, respectively. The valve stem has a free end and an engagement end where the engagement end engages the valve sealing body so that rotation of the valve stem operates the valve sealing body between the open and closed positions. A measurement passage is defined through the valve stem from the free end to the engagement end. The measurement passage is in fluid communication with the fluid passage when the valve sealing body is in the open position, and at least one sealing member is positioned within the measurement passage.

20 Claims, 11 Drawing Sheets

U.S. PATENT DOCUMENTS

| | | |
|---|---|---|
| 6,741,179 B2 | 5/2004 | Young |
| 6,892,999 B2 * | 5/2005 | Hall et al. ............ 251/149.5 |
| 6,899,317 B2 | 5/2005 | Brady et al. |
| 2002/0144735 A1 | 10/2002 | Nimberger |
| 2005/0016592 A1 | 1/2005 | Jeromson et al. |
| 2005/0087235 A1 | 4/2005 | Skorpik et al. |
| 2005/0115619 A1 | 6/2005 | Kawulka et al. |
| 2005/0151102 A1 | 7/2005 | Brinks et al. |

FOREIGN PATENT DOCUMENTS

| | | |
|---|---|---|
| EP | 0 459 376 A1 | 12/1991 |
| EP | 1 091 087 A2 | 4/2001 |
| EP | 0 091 087 B1 | 11/2004 |
| EP | 1 843 069 A1 | 10/2007 |

* cited by examiner

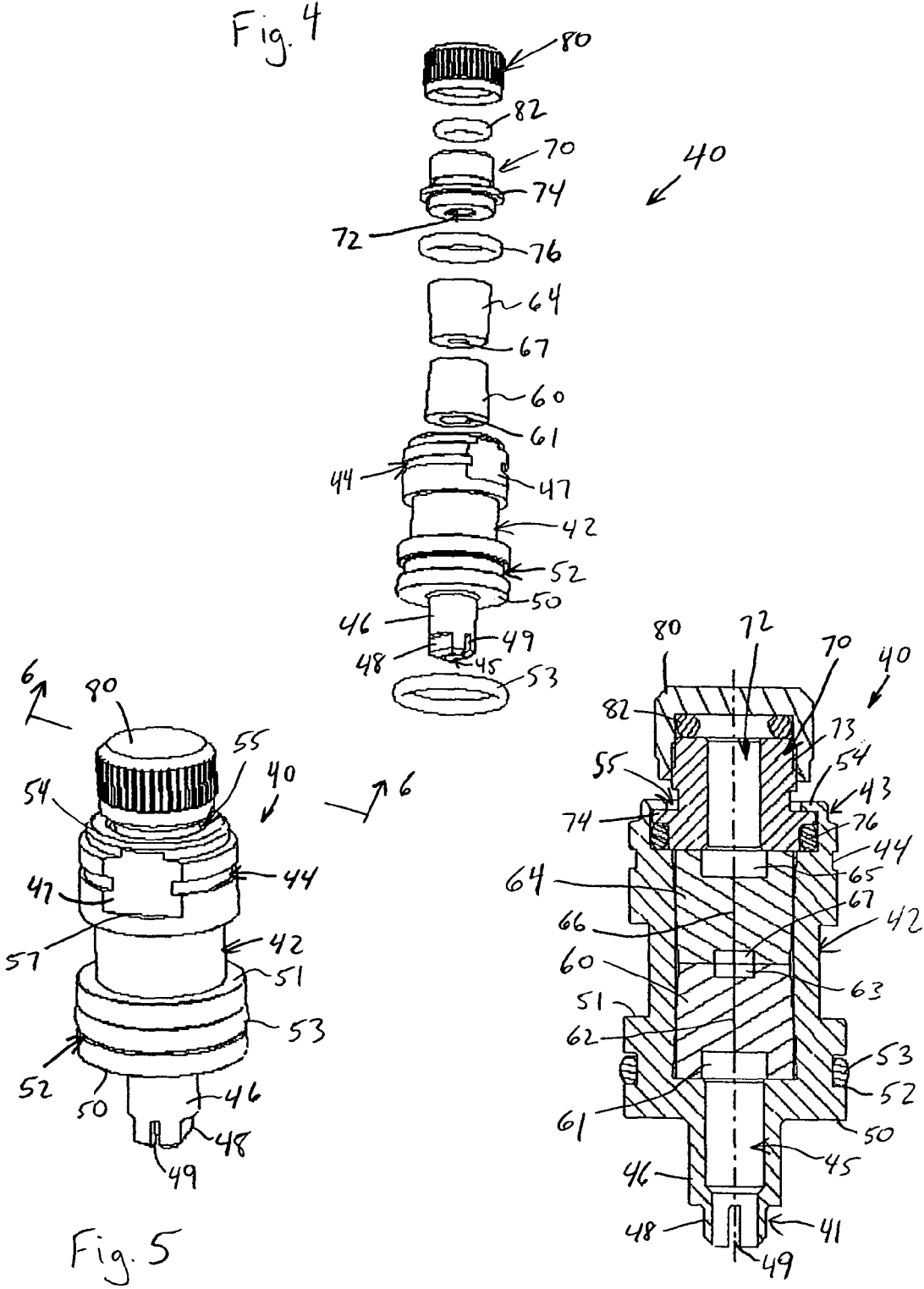

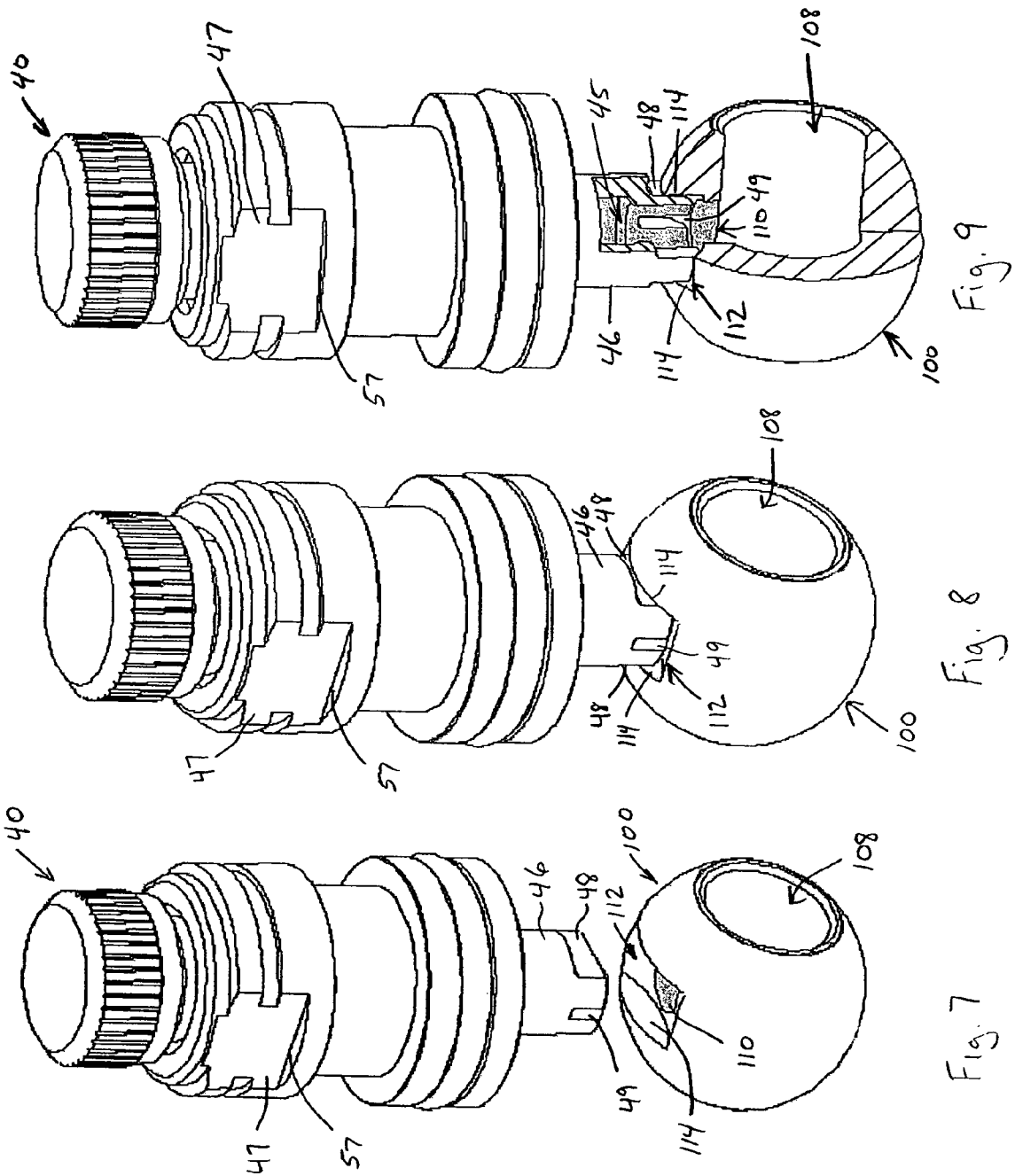

PORT INTEGRATED WITHIN VALVE STEM

FIELD OF THE INVENTION

The present invention relates generally to valve assemblies and more particularly to ports for determining process conditions such as temperature and pressure within the valve assemblies.

BACKGROUND OF THE INVENTION

Valves are well known in the art as a way of regulating fluid flow. Different valves, such as ball valves, gate valves or globe valves, may be utilized depending on the desired fluid dynamics and the specific application. Use of valves often requires different measurements of the fluid in order to maintain the proper internal conditions, for example pressure and temperature. These measurements are typically made at dedicated test openings along the valve body usually before or after the sealing portion of the valve. U.S. Pat. No. RE37,617 E, incorporated herein by reference, describes a pair of test port openings on the inlet side of a ball valve. However, these dedicated test openings require extra machining of the part and a lengthening of the overall assembly which increases the cost and complexity of the assembly. Furthermore, with an increased number of openings there is an increased likelihood of other undesired results including a higher potential for leakage and pressure failure of the assembly.

SUMMARY OF THE INVENTION

The present invention is embodied in a valve assembly with an integrated port defined through the valve stem assembly in order to easily determine conditions of the fluid flowing through the valve.

In at least one exemplary embodiment, the invention provides a valve body defining a fluid passage with a valve sealing body positioned therein. The valve sealing body is operable between open and closed positions which allow for fluid-flow and non-flow, respectively. The valve stem has a free end and an engagement end where the engagement end engages the valve sealing body so that rotation of the valve stem operates the valve sealing body between the open and closed positions. A measurement passage is defined through the valve stem from the free end to the engagement end. The measurement passage is in fluid communication with the fluid passage when the valve sealing body is in the open position, and at least one sealing member is positioned within the measurement passage.

In at least one exemplary embodiment, the invention provides a valve stem assembly comprising a valve stem body having a free end and an engagement end with the engagement end configured to engage a valve sealing body within a valve body such that rotation of the valve stem body relative to the valve body operates the valve sealing body. A measurement passage is defined through the valve stem body from the free end to the engagement end. At least one sealing member is positioned within the measurement passage.

BRIEF DESCRIPTION OF THE DRAWINGS

FIG. 4 is an exploded isometric view of an exemplary valve stem assembly of the present invention.

FIG. 5 is an isometric view of the valve stem assembly of FIG. 3.

FIG. 6 is a cross sectional view along the line 6-6 in FIG. 5.

FIG. 7 is an exploded isometric view of the valve stem assembly and the valve ball of an exemplary embodiment of the present invention.

FIG. 8 is an isometric view similar to FIG. 7 and illustrating the valve stem assembly engaged with the valve ball.

FIG. 9 is an isometric view similar to FIG. 8 in partial section.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Certain terminology is used in the following description for convenience only and is not limiting. The words "forward" and "rear" refer to directions toward and away from, respectively, the geometric center of the valve assembly and designated parts thereof. The terminology includes the words specifically mentioned above, derivatives thereof and words of similar import.

Figure 1:
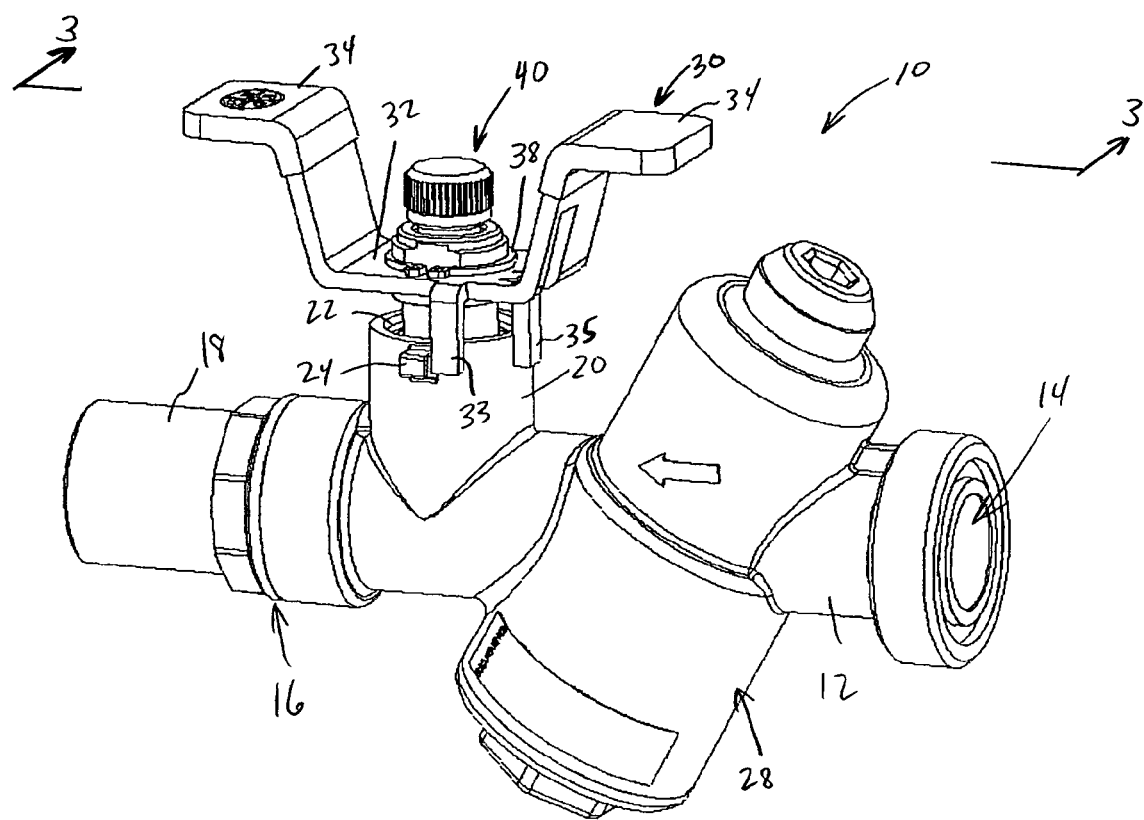
FIG. 1 is a front view of an exemplary embodiment of the valve assembly of the present invention.
Figure 2:
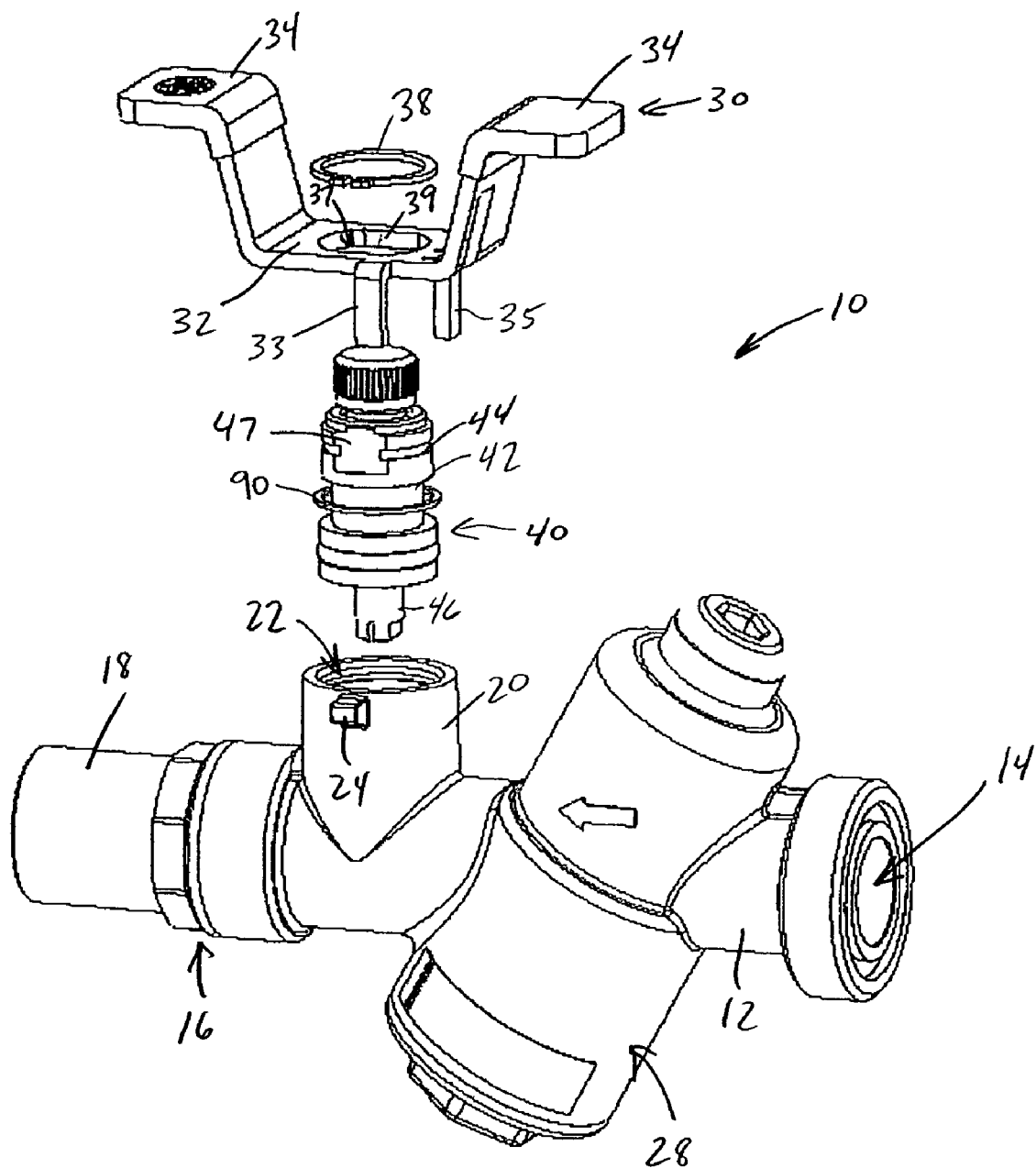
FIG. 2 is an exploded view of the valve assembly of FIG. 1 with the valve stem assembly exploded from the valve assembly body.
Figure 3:
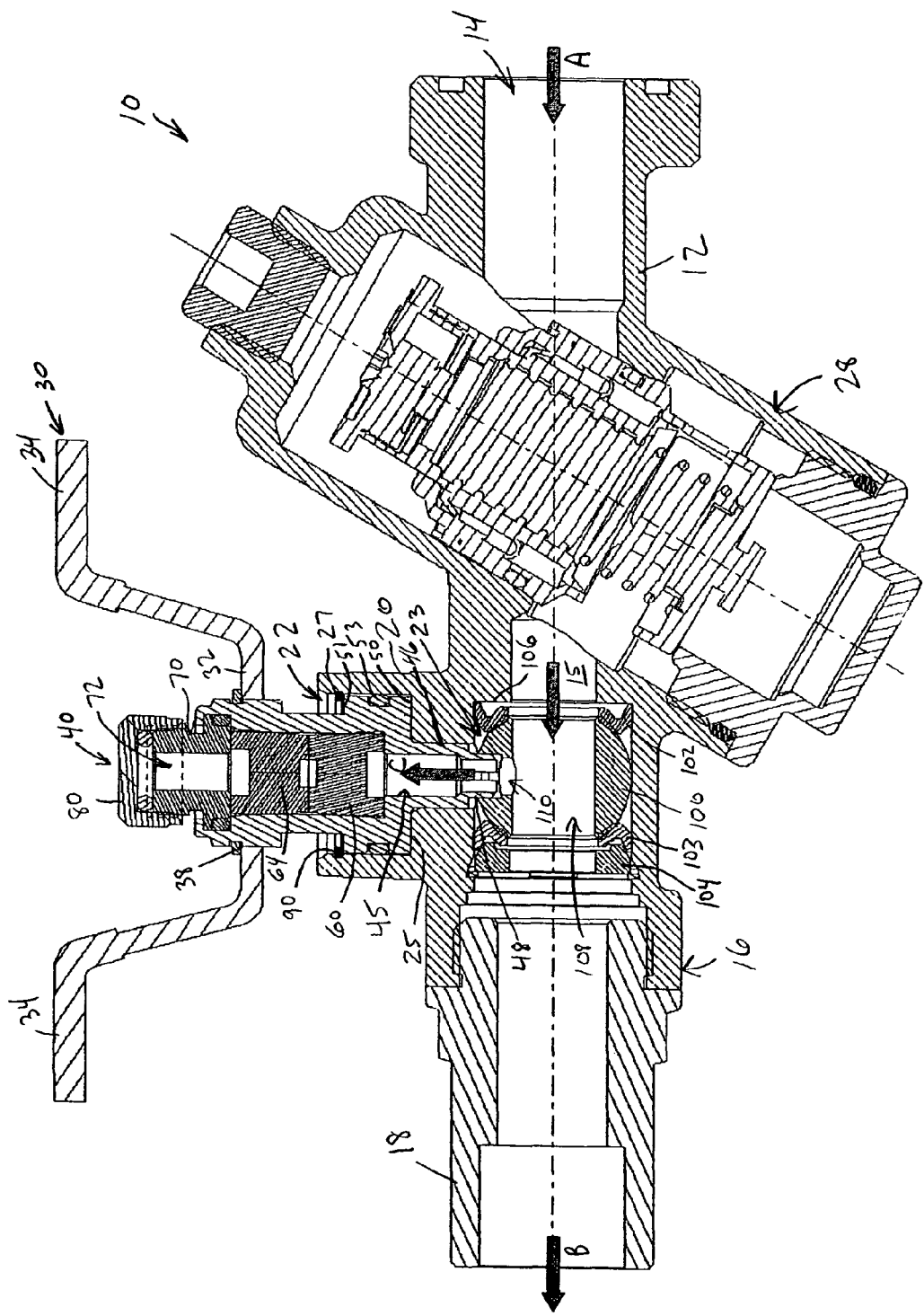
FIG. 3 is a cross sectional view along the line 3-3 in FIG. 1.

Referring now to the drawings, a valve assembly 10 that is an exemplary embodiment of the present invention will be described. Referring to FIGS. 1-3, the valve assembly 10 generally comprises a valve body 12 with an inlet end 14 and an outlet end 16 and a flow path 15 therebetween. The inlet and outlet ends 14 and 16 may be provided with various connectors, for example, internally or externally threaded connectors or smooth connectors. The outlet end 16 is illustrated with a threaded connection to an outlet pipe 18, however, the invention is not limited to the type of connectors at the inlet and outlet thereof. Additionally, the illustrated embodiment of the valve assembly 10 includes a balancing valve assembly 28 provided along the flow path 15, however, such is not required. The various components illustrate that the present invention may be utilized with valve assemblies of varying types and configurations.

A flow control quarter-turn ball valve 100 is rotatably mounted in a ball valve chamber 23 in the valve body 12 on a pair of ball seals 102 and 103 which are retained between a retaining member 104 and a shoulder 106. While ball seals are illustrated in the current embodiment, any of various types of seals may be provided for the ball valve. The flow control quarter-turn ball valve 100 is rotatably mounted about an axis perpendicular to the longitudinal axis of the valve body 12. The valve ball 100 includes a main through passage 108 extending therethrough. The valve ball 100 is controllable within the valve ball chamber 23 between an open position wherein the main through passage 108 is parallel to the fluid path 15 (see FIG. 3), a closed position wherein the main through passage 108 is substantially perpendicular to the fluid path 15 (see FIG. 10), and any desired position therebetween.

As shown in FIG. 3, the valve body 12 is provided with a transverse, outwardly extended integral hub 20 which is positioned centrally relative to the ball valve chamber 23. The hub 20 is provided with a stepped internal bore 22 which is in communication with the ball valve chamber 23. A valve stem assembly 40 is positioned in the internal bore 22 of the hub 20 and engages the ball valve 100 for controlled operation thereof. The structure and operation of the ball valve 100 will be described in more detail hereinafter. The internal bore 22 defines a seat 25 configured to support the valve stem assembly 40 as described below.

An exemplary valve stem assembly 40 will now be described with reference to FIGS. 4-6. The valve stem assembly 40 generally includes a cylindrical body 42 extending between a forward end 41 and a rear end 43. While the illustrated body 42 is cylindrical, the invention is not limited to such and the body 42 may have other configurations. A stepped bore 45 extends through the body 42 from the rear end 43 to the forward end 41. The rear end 43 includes an opening 55 into the stepped bore 45. The forward end 41 includes an engagement portion 46 through which the stepped bore 45 extends.

Figure 12:
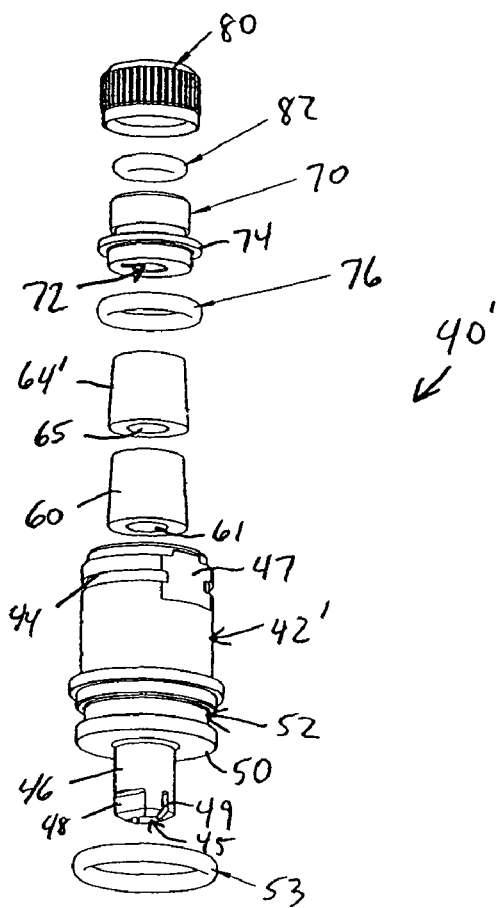
FIG. 12 is an exploded isometric view of an alternative exemplary valve stem assembly of the present invention.
Figure 13:
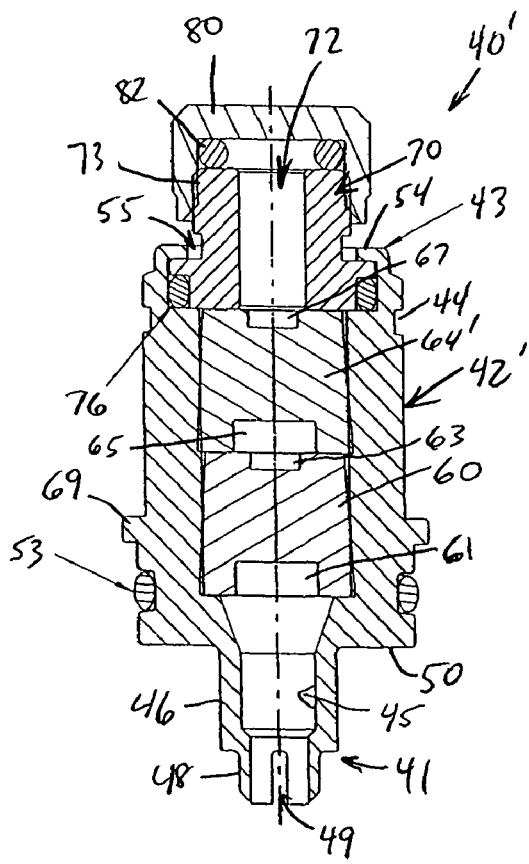
FIG. 13 is a cross sectional view, similar to FIG. 6, of the valve stem assembly of FIG. 12.

The valve stem body 42 extends radially outward adjacent the engagement portion 46 to define a shoulder 50. An annular groove 52 extends about the body 42 adjacent the shoulder 50 and is configured to receive an o-ring seal 53. Above the annular groove 52 is an annular locking seat 51. Referring to FIG. 3, when the valve stem assembly 40 is positioned in the internal bore 22 of the hub 20, the shoulder 50 sits upon the seat 25 and the o-ring seal 53 seals against the inside surface of the internal bore 22. A snap ring 90 is positioned about the stem valve body 42 and is configured to snap fittingly engage an internal annular groove 27 within the hub 20. With the snap ring 90 engaged in the annular groove 27, the snap ring 90 engages the annular locking shoulder 51 and thereby locks the valve stem assembly 40 within the hub internal bore 22. Other mechanisms for retaining the valve stem assembly 40 may also be utilized. For example, in the alternative exemplary valve stem assembly 40' illustrated in FIGS. 12 and 13, the valve stem body 42' has a generally uniform diameter except for the retaining shoulder 69 extending outward therefrom. The retaining shoulder 69 is configured to be engaged by a locking nut (not shown) threadably engaged within the hub internal bore 22.

Referring to FIGS. 2, 3 and 5, the rear end 43 of the valve stem body 42 includes opposed flat handle sides 47 which define opposed shoulders 57 configured to support a handle 30 on the rear end 43 of the valve stem body 42. As shown in FIG. 2, the handle 30 of the present embodiment includes a central portion 32 with a through hole 37 and outwardly extending handle bar portions 34. The central portion 32 is positioned on the valve stem body 42 such that it is supported by the opposed shoulders 57. A snap ring 38 is positioned about the valve stem body 42 and is retained in an external annular groove 44 to retain the handle 30 on the valve stem body 42. The through hole 37 is formed with opposed flat portions 39 configured to align with the flat handle sides 47 of the valve body 42 such that rotation of the handle 30 will cause the flat portions 39 to engage the flat handle sides 47 and thereby rotate the valve stem body 42. Rotation of the valve stem body 42 controls the position of the ball valve 100 as will be described hereinafter. A pair of stop members 33 and 35 preferably depend from central portion 32 and are configured to engage external stops 24 (only one shown) on the hub 20 to limit rotation of the handle 30, and thereby the valve stem body 42, relative to the valve body hub 20. While a mechanical handle is illustrated, other means, for example, an electromechanical actuator, may alternatively be utilized.

Referring to FIGS. 3 and 7-9, engagement of the engagement portion 46 of the valve stem body 42 with the valve ball 100 of the present embodiment will be described. The valve ball 100 includes a secondary passage 110 extending perpendicular to the main through passage 108. The secondary passage 110 extends from the main through passage 108 to an engagement slot 112 on the external surface of the valve ball 100. The engagement slot 112 has a generally rectangular shape with opposed flat wall surfaces 114. The engagement portion 46 of the valve stem body 42 has corresponding opposed flat wall surfaces 48 configured to engage the engagement slot flat wall surfaces 114. Slots 49 preferably extend between the opposed flat wall surfaces 48 such that the engagement portion 46 may compress slightly during engagement to provide a compression fit between the valve stem engagement portion 46 and the valve ball engagement slot 112. The orientation of the opposed flat wall surfaces 48 relative to the flat handle sides 47 is controlled such that the orientation of the handle 30 will dictate the position of the ball valve 100 in a controlled manner. In the illustrated embodiment, the surfaces 47 and 48 are offset by 90° such that the ball valve 100 is in the open position when the handle 30 extends parallel to the flow path 15 and is in the closed position when the handle 30 extends perpendicular to the flow path 15. Other orientations and configurations are also possible.

As illustrated in FIG. 9, when the valve stem body 42 is engaged with the ball valve 100, the secondary passage 110 is aligned with and in fluid communication with the valve stem stepped bore 45 such that a portion of the fluid passing through the main through passage 108 will also flow through the secondary passage 110 to the valve stem bore 45. Controlled passage of fluid through valve stem bore 45 provides a test port through the valve stem assembly 40.

The internal configuration of the valve stem assembly 40 will be described with reference again to FIGS. 3-6. A pair of elastomeric members 60 and 64 are positioned in the bore 45. Each elastomeric member 60, 64 has a tapered cylindrical shape with a larger counter sink bore 61, 65, respectively, adjacent the larger end of the cylinder and a smaller counter sink bore 63, 67, respectively, adjacent the smaller end of the cylinder. A generally closed through bore 62, 66, respectively, extends between the respective counter sink bores 61, 63 and 65, 67. The elastomeric members 60 and 64 may be made from any desired elastomeric material which generally returns to its original shape after pressure is removed therefrom. An illustrative material is ethylene-propylene-diene-monomer ("EPDM").

In the present embodiment, the elastomeric members 60, 64 are positioned opposite to one another such that both members 60, 64 narrow toward one another. However, as illustrated in the alternative exemplary valve stem assembly 40' shown in FIGS. 12 and 13, the elastic members 60 and 64' may be alternatively positioned. In valve stem assembly 40', both elastic members 60 and 64' are oriented such that their smaller end extends toward the forward end 41 of the valve stem body 42'. Other configurations and arrangements are also possible. For example, a single elastic member or more than two elastic members may be utilized. Additionally, the elastic member(s) may have any of various shapes other than the illustrated tapered shapes.

The taper of the elastomeric members 60, 64 and the configuration of the counter sink bores 61, 63, 65, 67 facilitates expansion of the generally closed through bores 62, 66 during passage of a probe member or the like. In the normal, unpenetrated configuration illustrated in FIG. 6, the elastomeric members 60, 64 substantially seal and prevent the passage of fluid through bore 45.

An attachment member 70 extends through the open end 55 of the valve stem body 42 with a portion thereof positioned within the bore 45 in engagement with the elatastomeric member 64. In the present embodiment, the attachment member has radial shoulder 74 configured to be engaged by a lip 54 of the valve stem body 42 to retain the attachment member 70. To assemble the valve stem assembly 40, the elastomeric members 60 and 64 are positioned within the stepped bore 45, an o-ring seal 76 is placed about the forward end the attachment member 70, the forward end is positioned within the stepped bore 45, and the open end 55 of the valve stem body 42 is rolled or otherwise inwardly deformed to define the lip 54 which engages and retains the attachment member shoulder 74. Other means of assembling the attachment member 70 to the valve stem body 42 may also be utilized, for example, the attachment member 70 may be threadably connected to the valve stem body 42, welded thereto, soldered thereto, press fit therein, or otherwise secured.

The attachment member 70 has a through bore 72 which is preferably coaxial with the elastomeric member through bores 62, 66. As such, the attachment member through bore 72 and the elastomeric member through bores 62, 66 provide a sealed measurement passage for a test probe or the like to be passed through into communication with fluid which may be in the valve stem bore 45. When not being utilized for testing, the through bore 72 is preferably covered by a removable cap 80 or the like. In the present embodiment, the external end of the attachment member 70 has a series of external threads 73 which facilitates threaded engagement with the cap 80. Other engagement means, for example, a snap fit or the like, may also be utilized. An o-ring seal 82 is preferably positioned within the cap 80 to seal against the attachment member 70.

Figure 10:
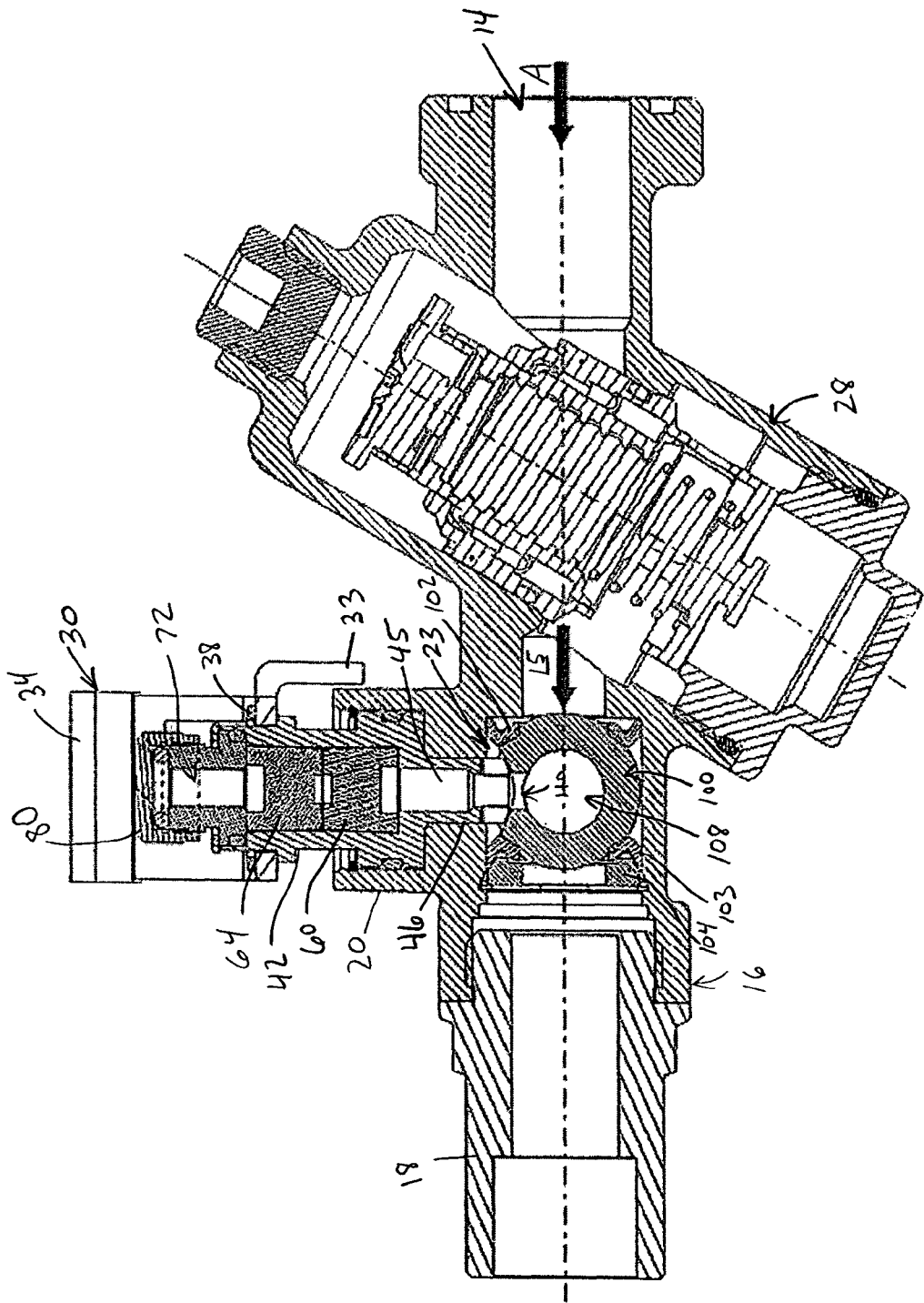
FIG. 10 is a cross sectional view, similar to FIG. 3, illustrating the valve assembly in a closed position.

Having generally described the components of the exemplary valve assemblies 10 of the present invention, operation thereof will be described with reference to FIGS. 3, 10 and 11. Referring to FIG. 10, the valve assembly 10 is shown in a closed position. The ball valve 100 has been rotated by the handle 30, via interaction of the handle 30 with the valve stem body 42 and corresponding interaction of the valve stem engagement portion 46 with the valve ball engagement slot 112, to a position wherein the main through passage 108 is perpendicular to the fluid path 15. Fluid flows in through the inlet, as indicated by arrow A, but is prevented from further flow by the contact of the valve ball 100 with the ball seal 102.

Figure 11:
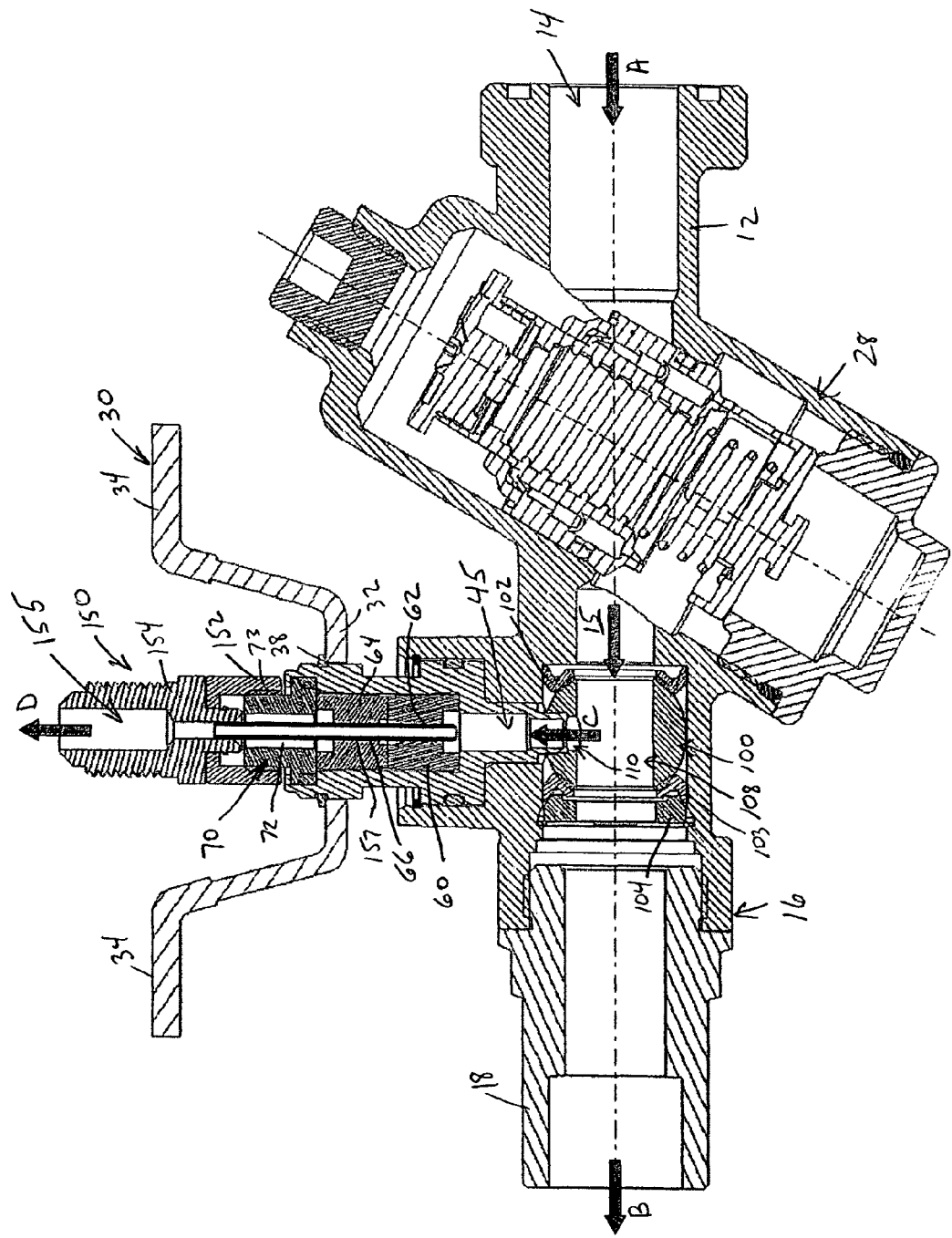
FIG. 11 is a cross sectional view, similar to FIG. 3, illustrating the valve assembly in an open position with a test probe positioned relative to the valve stem assembly.

To open the ball valve 100, as illustrated in FIGS. 3 and 11, the handle 30 is rotated. Rotation of the handle 30 causes the handle flat portions 39 to contact the flat handle sides 47 on the valve stem body 42 which causes rotation of the valve stem body 42. Rotation of the valve stem body 42 in turn causes rotation of the ball valve 100 via engagement of the engagement portion flat wall surfaces 48 with the engagement slot flat wall surfaces 114. Referring to FIG. 3, when the ball valve 100 is in the open position, fluid is free to flow through the main through passage 108 to the valve exit 16/18, as indicated by arrow B. At the same time, a portion of the fluid passing through the main through passage 108 also passes through secondary passage 110 into the valve stem bore 45, as indicated by arrow C. The fluid is prevented from free passage through the valve stem bore 45 by the elastomeric members 60 and 64. The valve assembly 10 may be operated in a normal manner to control fluid flow through the valve assembly 10.

If it is desired to measure a characteristic of fluid passing through the valve assembly 10, the valve stem assembly cap 80 is removed from the attachment member 70 and a testing instrument 150 is attached thereto, as illustrated in FIG. 11. The testing instrument 150 may be of any conventional type. The illustrated testing instrument 150 includes a connector 152 configured to be releasably connected to the external end of the attachment member 70. In the present embodiment, the connector 152 has internal threads configured to engage the external threads 73 on the attachment member 70. Other connection means may also be utilized. The testing instrument 150 further includes a body 154 connected to the connector 152 and configured to provide an external port 155. A hollow probe or needle 157 extends from a forward end of the body 154 such that connection of the testing instrument 150 to the attachment member 70 causes the probe or needle 157 to penetrate and extend through the elastomeric member through bores 66 and 62. The hollow probe or needle 157 extends through both elastomeric members 64 and 60 such that its forward end establishes a fluid communication with the valve stem bore 45. As such, fluid is free to flow through the secondary passage 110, the valve stem bore 45, the probe or needle 157 and to external port 155, as indicated by arrow D. The fluid characteristics may be measured or otherwise tested through the external port 155 utilizing known equipment.

Figure 14:
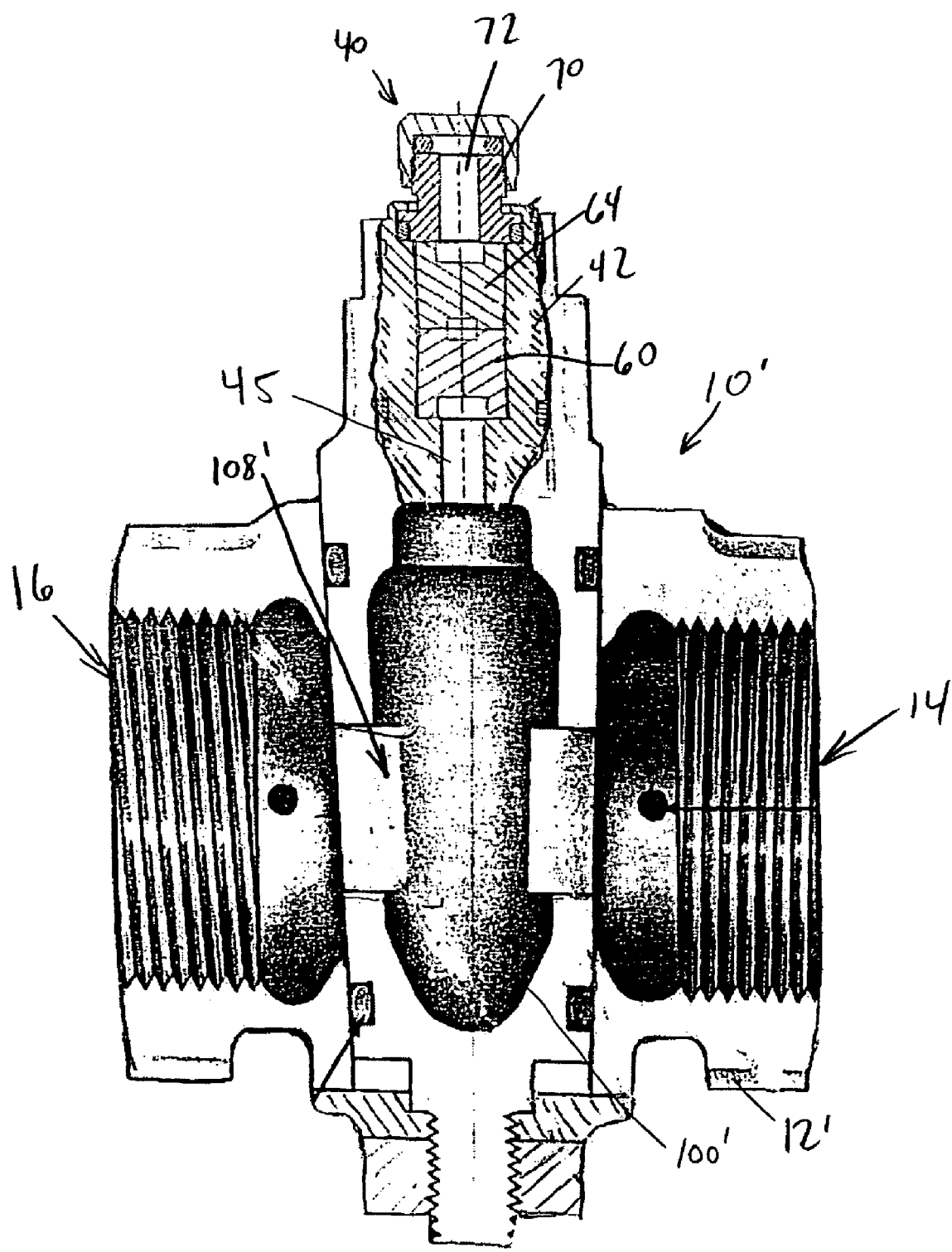
FIG. 14 is a front view, in partial section, of an alternative exemplary embodiment of the valve assembly of the present invention.
Figure 15:
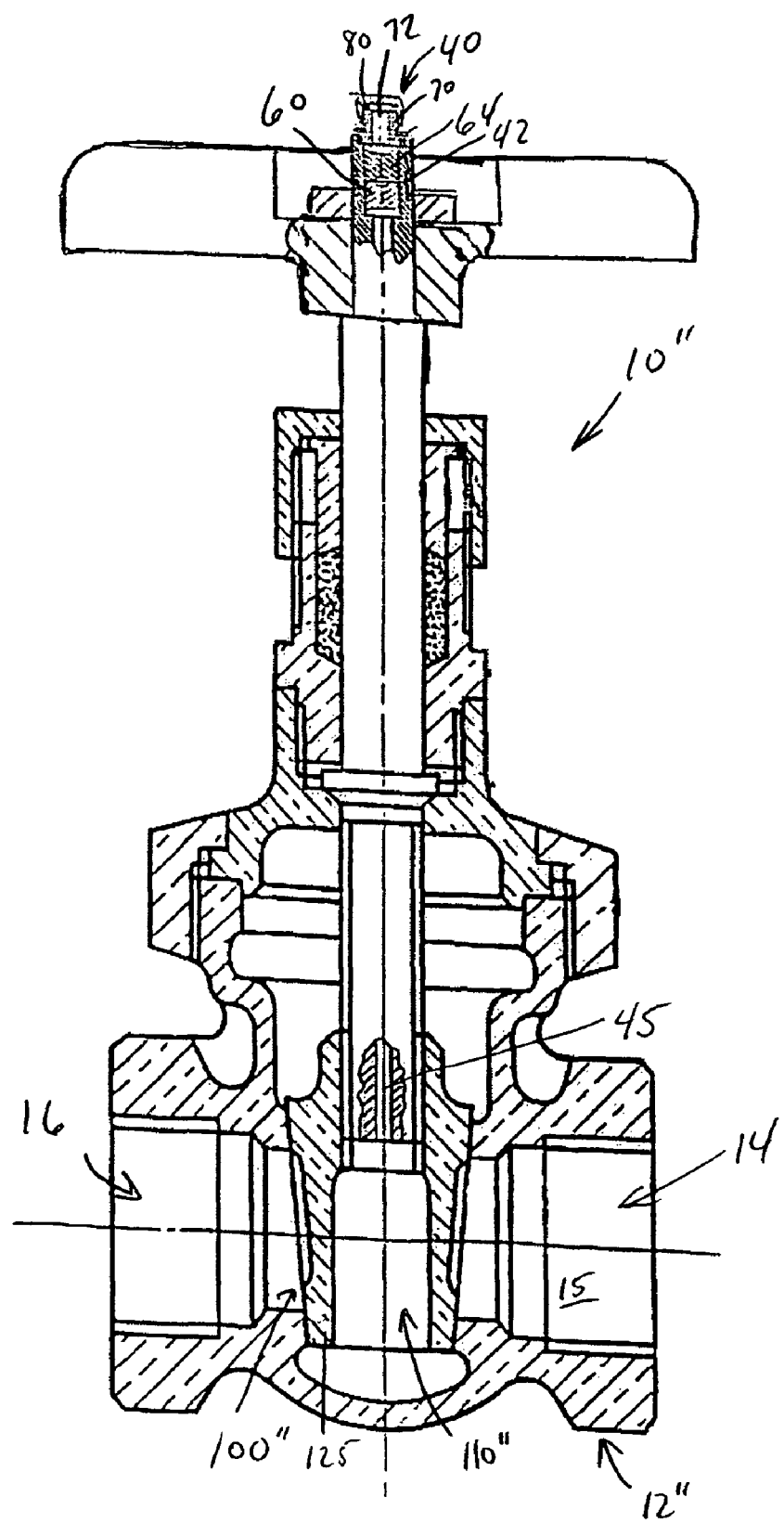
FIG. 15 is a front view, in partial section, of another alternative exemplary embodiment of the valve assembly of the present invention.
Figure 16:
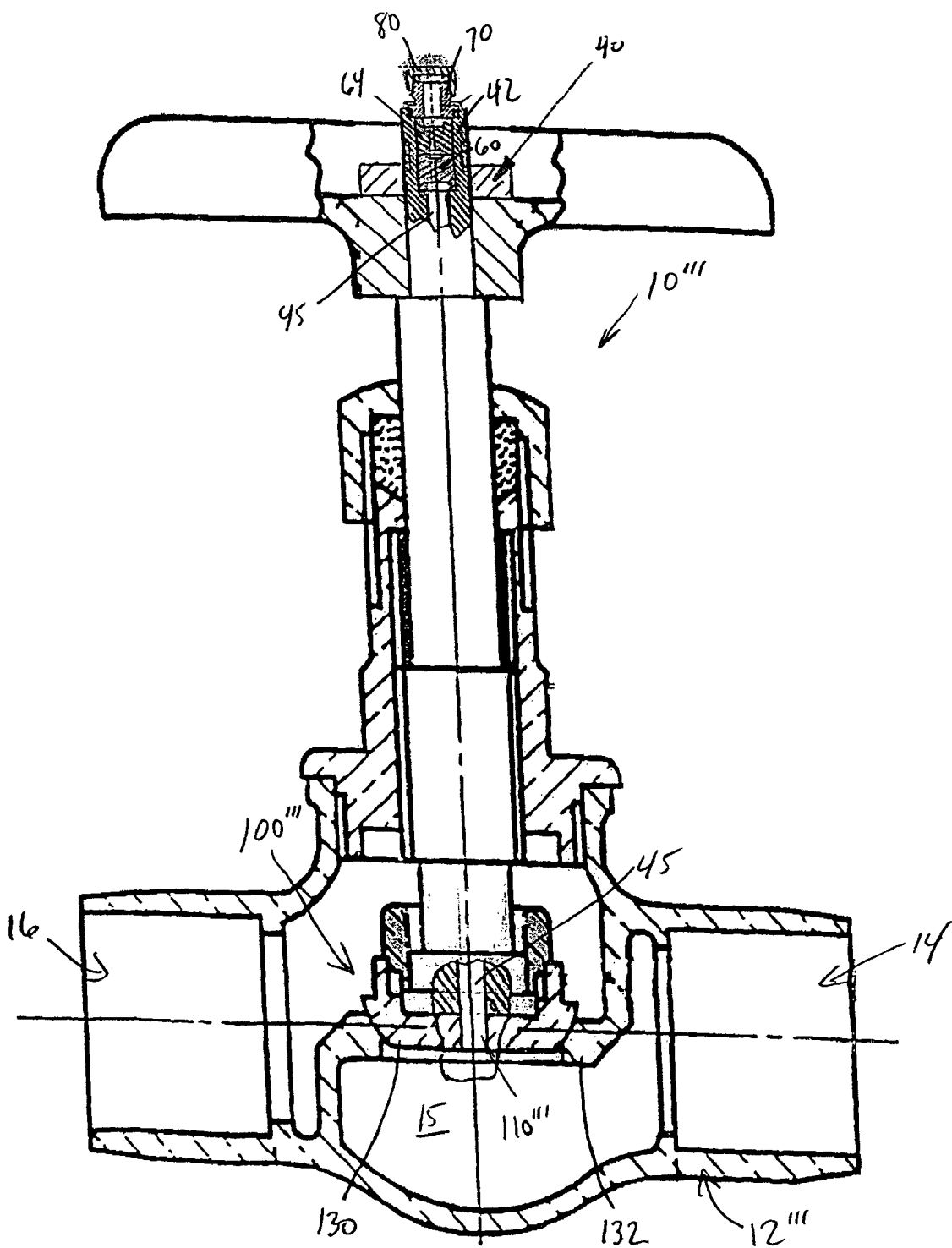
FIG. 16 is a front view, in partial section, of yet another alternative exemplary embodiment of the valve assembly of the present invention.

While the previous exemplary embodiments have illustrated ball valves, the invention is not limited to such. As illustrated in FIGS. 14-16, the valve mechanism may have other configurations. Referring to FIG. 14, the valve assembly 10' provides a plug valve 100' configuration. The valve assembly 10' includes a valve body 12' with an inlet end 14 and outlet end 16 with a plug valve 100' positioned therebetween. The plug valve 100' includes a main through passage 108' with a secondary passage (not shown) configured to communicate with the valve stem bore 45 similar to the ball valve embodiments. The valve stem assembly 40 is substantially as in the previous embodiments, however, may include a longer bore 45 and a different engagement mechanism.

Referring to FIG. 15, the valve assembly 10" provides a gate valve 100" configuration. The valve assembly 10" includes a valve body 12" with an inlet end 14 and outlet end 16 with a gate valve 100" positioned in the fluid path 15 therebetween. The gate valve 100" includes a gate 125 configured to move into and out of the flow path 15. A secondary passage 110" extends into the gate 125 and is configured to communicate with the valve stem bore 45. The valve stem assembly 40 is substantially as in the previous embodiments, however, it includes a longer bore 45 and a different engagement mechanism.

Referring to FIG. 16, the valve assembly 10''' provides a globe valve 100''' configuration. The valve assembly 10''' includes a valve body 12''' with an inlet end 14 and outlet end 16 with a globe valve 100''' positioned in the fluid path 15 therebetween. The globe valve 100''' includes a plug 130 configured to move into and out of contact with a seat 132 within the flow path 15. A secondary passage 110''' extends through the plug 130 and is configured to communicate with the valve stem bore 45. The valve stem assembly 40 is substantially as in the previous embodiments, however, it includes a longer bore 45 and a different engagement mechanism. Fluid will generally flow through the secondary passage 110''' even when the valve is closed, however, the fluid will be prevented from free fluid flow by the elastomeric members 60 and 64 within the valve stem assembly 40.

While preferred embodiments of the invention have been shown and described herein it will be understood that such embodiments are provided by way of example only. Numerous variations, changes and substitutions will occur to those skilled in the art without departing from the spirit of the invention. Accordingly, it is intended that the appended claims cover all such variation as fall within the spirit and scope of the invention.

What is claimed is:

1. A valve assembly comprising:
   a valve body defining a fluid passage;
   a valve sealing body positioned within the fluid passage and operable between an open, fluid-flow position and a closed, non-flow position;
   a valve stem having a free end and an engagement end, the engagement end engaging the valve sealing body such that rotation of the valve stem operates the valve sealing body between the open and closed positions;
   a measurement passage defined through the valve stem with an axis extending from the free end to the engagement end such that the measurement passage is in fluid communication with the fluid passage at least when open; and
   at least one sealing member positioned within the measurement passage, the at least one sealing member having an elastomeric body extending across and sealing the measurement passage with the axis extending through the elastomeric body.

2. The valve assembly according to claim 1 wherein the valve sealing body is any valve capable of being actuated by a valve stem.

3. The valve assembly according to claim 1 wherein a handle is connected to the valve stem proximate the free end thereof.

4. The valve assembly according to claim 1 wherein a removable sealing cap is configured to selectively cover the free end of the valve stem.

5. The valve assembly according to claim 1 wherein the engagement end of the valve stem is mated within the valve sealing body by an interference fit.

6. The valve assembly according to claim 1 wherein the valve sealing body is a ball with a main through passage and a secondary through passage extending from the main through passage and aligned with the measurement passage to facilitate fluid communication from the main through passage to the measurement passage when there is flow through the fluid passage.

7. The valve assembly according to claim 1 wherein the valve sealing body is selected from the group consisting of a ball valve, a plug valve, a gate valve and a globe valve.

8. The valve assembly according to claim 1 wherein the at least one sealing member is a grommet.

9. The valve assembly according to claim 8 wherein the at least one sealing member is manufactured from EPDM.

10. The valve assembly according to claim 1 wherein the free end of the valve stem includes an attachment member configured for attachment with a testing instrument.

11. The valve assembly according to claim 1 wherein the valve stem includes a first engagement portion proximate to the free end thereof and configured to engage a handle member and a second engagement portion proximate to the engagement end and configured to engage the valve sealing body, the first and second engagement portions oriented relative to one another such that a given orientation is defined between the handle member and the valve sealing body.

12. The valve assembly according to claim 1 wherein the valve body includes a radial hub defining a bore therethrough and the valve stem engagement end extends through the bore.

13. The valve assembly according to claim 1 further comprising a balancing valve positioned along the fluid passage.

14. A valve stem assembly comprising:
   a valve stem body having a free end and an engagement end, the engagement end configured to engage a valve sealing body within a valve body such that rotation of the valve stem body relative to the valve body operates the valve sealing body;
   a measurement passage defined through the valve stem body with an axis extending from the free end to the engagement end; and
   at least one sealing member positioned within the measurement passage, the at least one sealing member having an elastomeric body extending across and sealing the measurement passage with the axis extending through the elastomeric body.

15. The valve stem assembly according to claim 14 wherein a handle is connected to the valve stem proximate the free end thereof.

16. The valve stem assembly according to claim 14 wherein a removable sealing cap is configured to selectively cover the free end of the valve stem.

17. The valve stem assembly according to claim 14 wherein the at least one sealing member is a grommet.

18. The valve stem assembly according to claim 17 wherein the at least one sealing member is manufactured from EPDM.

19. The valve stem assembly according to claim 14 wherein the free end of the valve stem body includes an attachment member configured for attachment with a testing instrument.

20. The valve stem assembly according to claim 14 wherein the valve stem body includes a first engagement portion proximate to the free end thereof and configured to engage a handle member and a second engagement portion proximate to the engagement end and configured to engage the valve sealing body, the first and second engagement portions oriented relative to one another such that a given orientation is defined between the handle member and the valve sealing body.

* * * * *